United States Patent
Shaver

[19]

[11] Patent Number: 5,884,826
[45] Date of Patent: Mar. 23, 1999

[54] VEHICLE EQUIPMENT RACK

[76] Inventor: Tori Shaver, 3484 Highway 30 W., Pocatello, Id. 83201

[21] Appl. No.: 906,724

[22] Filed: Aug. 5, 1997

[51] Int. Cl.⁶ .................................. B60R 9/06; B60R 9/10
[52] U.S. Cl. .......................... 224/509; 224/502; 224/521; 224/532; 224/553; 224/924; 211/195
[58] Field of Search .................................. 224/282, 488, 224/495, 497, 499, 502, 509, 522, 524, 531, 532, 547, 548, 549, 553, 924, 518–521; 211/168, 195, 222; 248/282.1

[56] References Cited

U.S. PATENT DOCUMENTS

| | | | |
|---|---|---|---|
| 1,585,871 | 5/1926 | Pels | 224/524 |
| 1,796,354 | 3/1931 | Ahlberg | 248/282.1 |
| 1,807,371 | 5/1931 | Binns | 224/499 |
| 1,853,608 | 4/1932 | Gundry | 224/499 |
| 3,163,339 | 12/1964 | Merchant | 224/547 |
| 3,550,892 | 12/1970 | Propst | 248/282.1 |
| 4,430,922 | 2/1984 | Fog et al. | 248/282.1 |
| 4,568,051 | 2/1986 | Rosengren | 248/282.1 |
| 5,094,373 | 3/1992 | Lovci . | |
| 5,443,189 | 8/1995 | Hirschfeld | 224/501 |
| 5,518,159 | 5/1996 | DeGuevara | 224/488 |
| 5,527,146 | 6/1996 | Allsop et al. | 414/462 |
| 5,529,231 | 6/1996 | Burgess | 224/502 |
| 5,664,717 | 9/1997 | Joder | 224/502 |
| 5,690,260 | 11/1997 | Aikins et al. | 224/924 |

FOREIGN PATENT DOCUMENTS

| | | | |
|---|---|---|---|
| 404658 | 12/1909 | France | 224/549 |
| 83898 | 4/1954 | Norway | 224/499 |
| 93810 | 12/1938 | Sweden | 224/533 |
| 9615 | 11/1915 | United Kingdom | 224/549 |
| 341835 | 1/1931 | United Kingdom | 224/553 |

*Primary Examiner*—Gregory M. Vidovich
*Attorney, Agent, or Firm*—Ormiston Korfanta & Holland, PLLC

[57] ABSTRACT

A vehicle equipment rack that includes first, second and third rotatably interconnected members. The second and third members rotate between a first position in which all three members are aligned and a second position in which the second and third members are angularly offset from the first member. The second and third members may also angularly offset from one another when the second and third members are in the second position. The vehicle equipment rack may also include a drive train operatively connected between the second and third members. The drive train is configured to rotate one of these moveable members upon rotation of the moveable member.

9 Claims, 10 Drawing Sheets

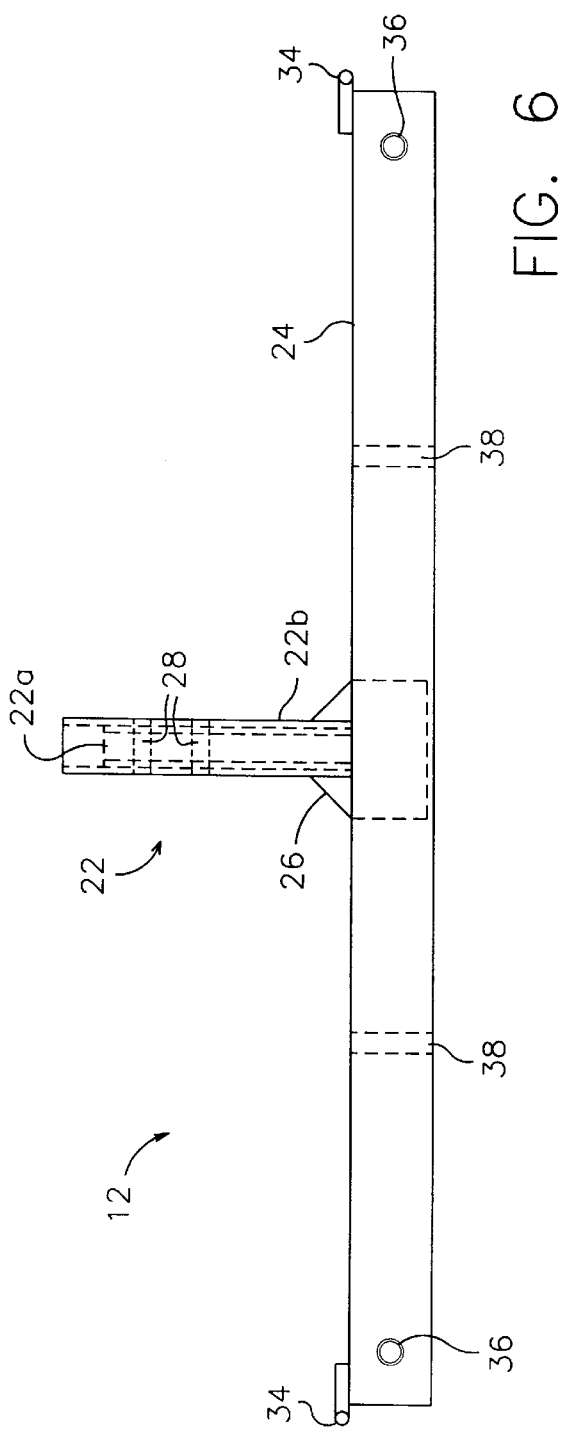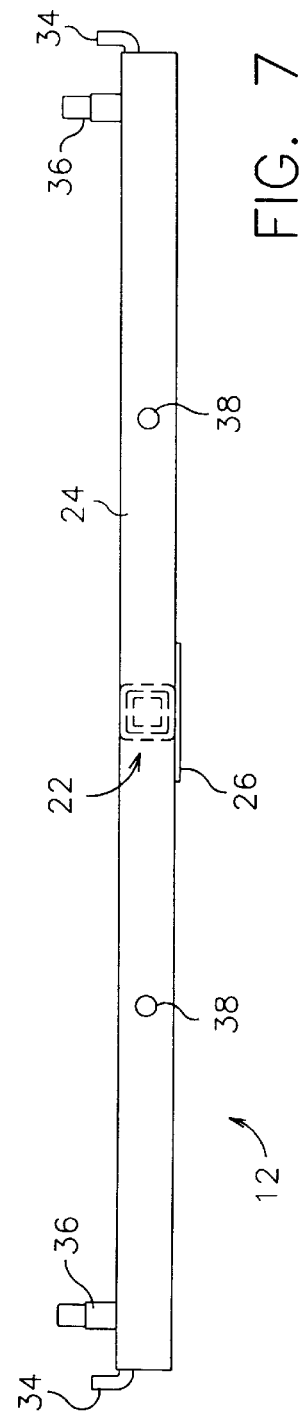

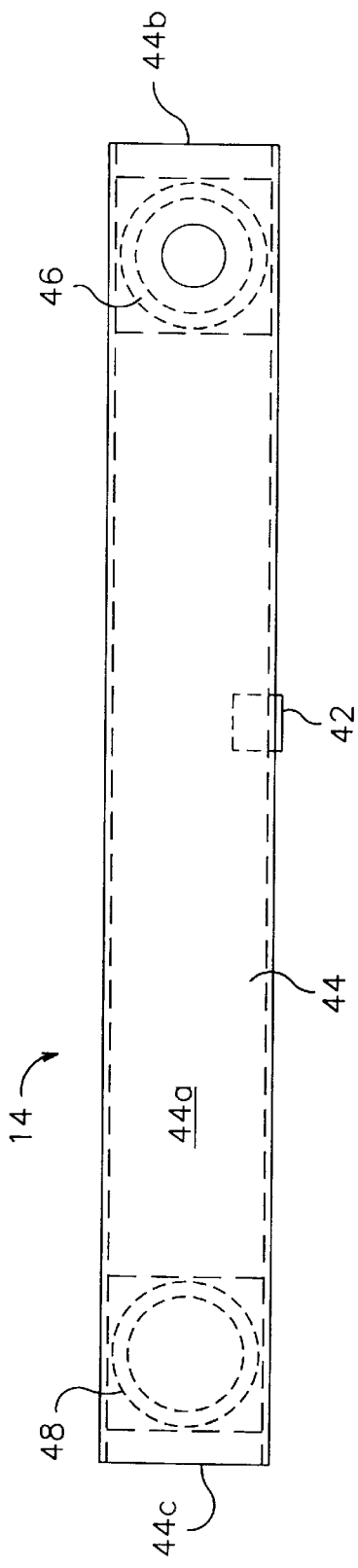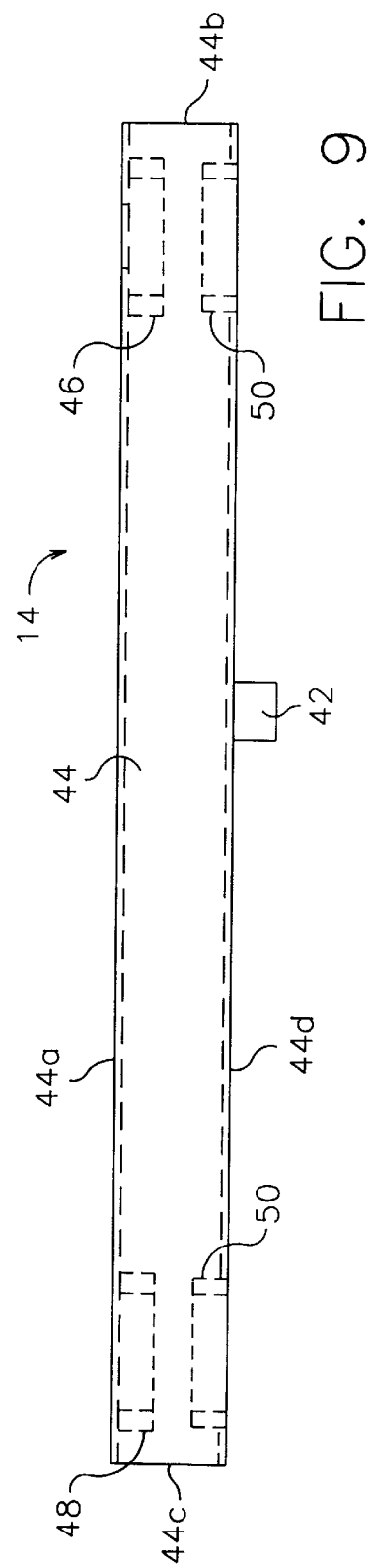

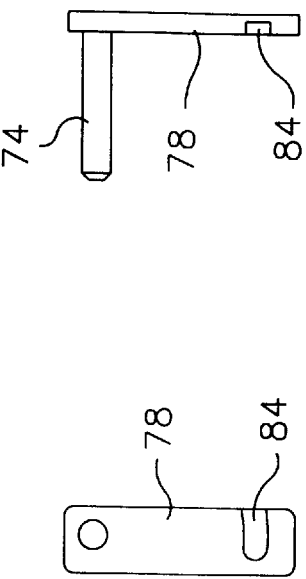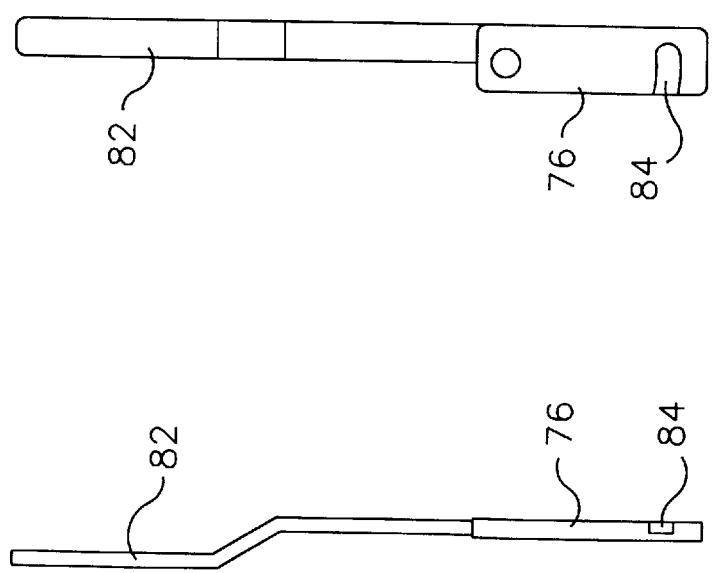

VEHICLE EQUIPMENT RACK

FIELD OF THE INVENTION

The present invention relates generally to vehicle equipment racks and, more particularly, to a rear mounted swing-out type vehicle equipment rack.

BACKGROUND OF THE INVENTION

The dramatic increase in the use of sport and recreation equipment during the 1980s and 1990s has created a substantial market for vehicle mounted equipment racks. Although exercisers and outdoor enthusiasts rack everything from kayaks and canoes to sailboards and surfboards, bicycles and skis are still the most common pieces of equipment carried on cars, pick-up trucks and sport utility vehicles. A variety of different vehicle equipment racks are commercially available. Top mounted racks are the most popular. Top mounted racks, however, are often hard to use, particularly with bicycles and on taller vehicles like sport utility vehicles and pick-up trucks. Rear mounted racks are less popular than top mounted racks despite the fact that they are easier to reach, perhaps because some rear mounted racks must be removed to access the rear of the vehicle while others afford only limited access to the rear of the vehicle.

SUMMARY OF THE INVENTION

The present invention is directed to a rear mounted vehicle equipment rack that provides full access to the rear of the vehicle even when the rack is installed and fully loaded. In one embodiment of the invention, the vehicle equipment rack includes first, second and third rotatably interconnected members. The second and third members rotate between a first position in which all three members are aligned and a second position in which the second and third members are angularly offset from the first member. In one version of this embodiment, the second and third members are also angularly offset from one another when the second and third members are in the second position. In a second embodiment, the vehicle equipment rack includes a stationary member and a plurality of rotatably interconnected moveable members operatively coupled to the stationary member. The moveable members rotate between a first position in which the moveable members are aligned and a second position in which at least two of the moveable members are angularly offset from one another. The vehicle equipment rack may also include a drive train operatively connected between the moveable members. The drive train is configured to rotate one of the moveable members upon rotation of another moveable member.

In another embodiment of the invention, the vehicle equipment rack includes a lower cross member oriented horizontally when the rack is installed on a vehicle. A pair of middle cross arms are positioned horizontally opposite one another over the lower cross member. One end of each middle cross arm is connected to and rotates on one end of the lower cross member. The rack also includes a pair of upper cross arms positioned horizontally opposite one another over the middle cross arms. One end of each upper cross arm is connected to and rotates on one end of each middle cross arm (the end of the middle cross arms opposite that connected to the lower cross member). Each pair of middle and upper cross arms can, therefore, unfold from the lower cross member as they rotate about their connecting points. An upright may be attached to each upper cross arm. Accessory arms are attached to each upright for carrying skis, bicycles and other equipment. Also, a drive train may be connected between each of the middle cross arms and the corresponding upper cross arms. The drive train is configured to rotate the middle (or upper) cross arms upon rotation of the upper (or middle) cross arms. It is expected that, in most situations, the drive train will be configured to rotate the middle cross arm away from the lower member upon rotation of the upper cross arm. In this way, the rack unfolds when the user pulls on the upright attached the upper cross arm.

In still another embodiment, the vehicle equipment rack consists of a first plurality of articulating arms (a pair of articulating arms, for example) and a second plurality of articulating arms. Each plurality of articulating arms is rotatably mounted opposite the another on the stationary member. The arms in each plurality of articulating arms may move in parallel planes, in horizontal planes or in the same plane.

The invention, as summarized above and defined in the claims at the end of this Specification, may be better understood with reference to the drawings and the following detailed description of the preferred embodiment.

DESCRIPTION OF THE DRAWINGS

FIG. 6 is a plan view of the lower member assembly.

FIG. 7 is an elevation view of the lower cross member assembly.

FIG. 8 is a plan view of the left middle cross arm assembly.

FIG. 9 is an elevation view of the left middle cross arm assembly.

FIGS. 11a and 11b are side and elevation views, respectively, of the latch handle and rear latch body.

FIGS. 11c and 11d are elevation and side views, respectively, of the front latch body and latch shaft pin.

DETAILED DESCRIPTION OF THE INVENTION

Figure 1:
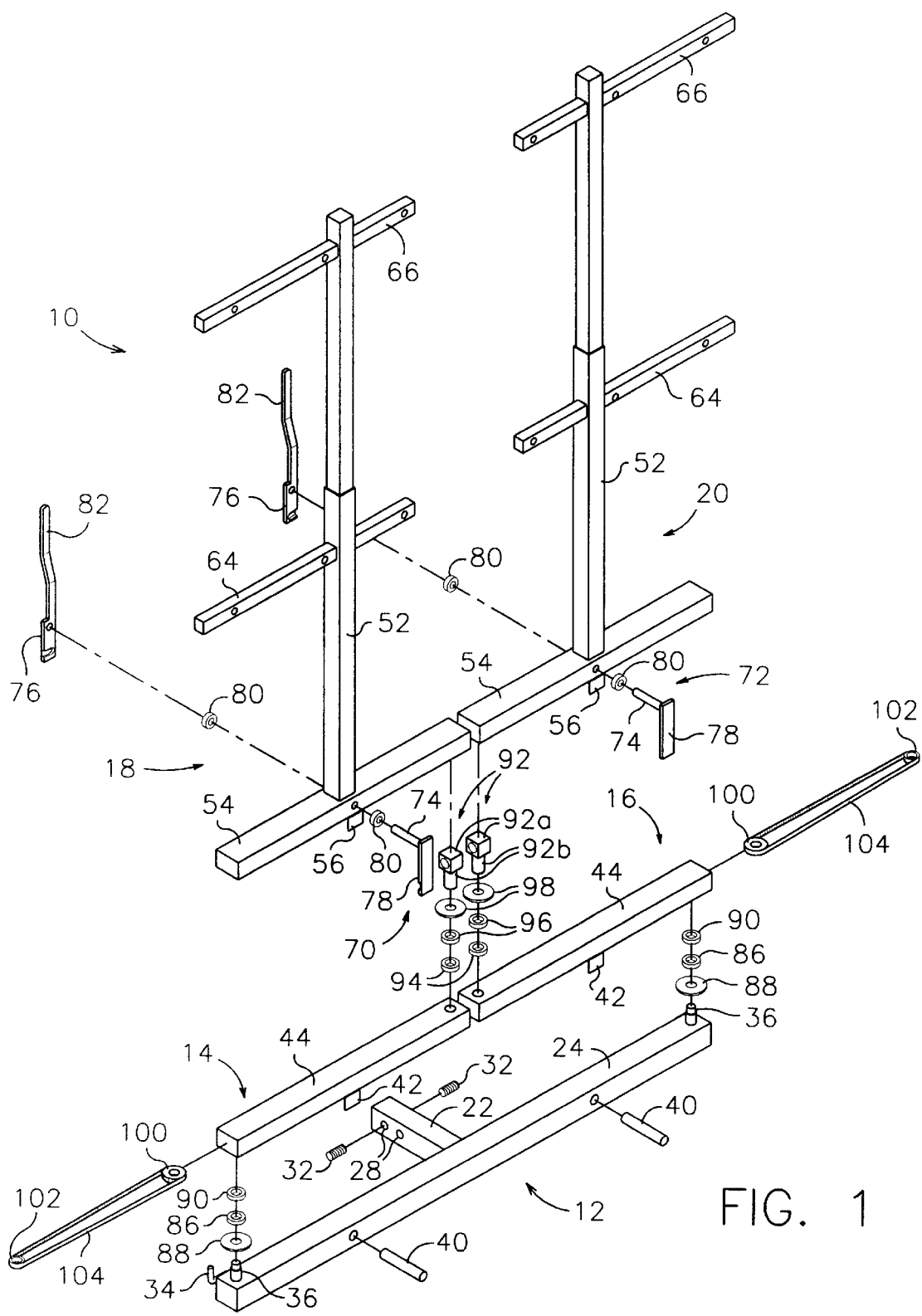
FIG. 1 is an exploded perspective view of one embodiment of the invented vehicle equipment rack.

Referring to FIG. 1, equipment rack 10 includes a lower member assembly 12, left and right middle cross arm assemblies 14 and 16, and left and right upper member assemblies 18 and 20. The parts of each of these assemblies will be described with reference to the exploded assembly view of FIG. 1 and the detail plan, elevation and side views of FIGS. 6–11. Then, the operation of the equipment rack will be described with reference to the perspective views of FIGS. 1–5.

Figure 5:
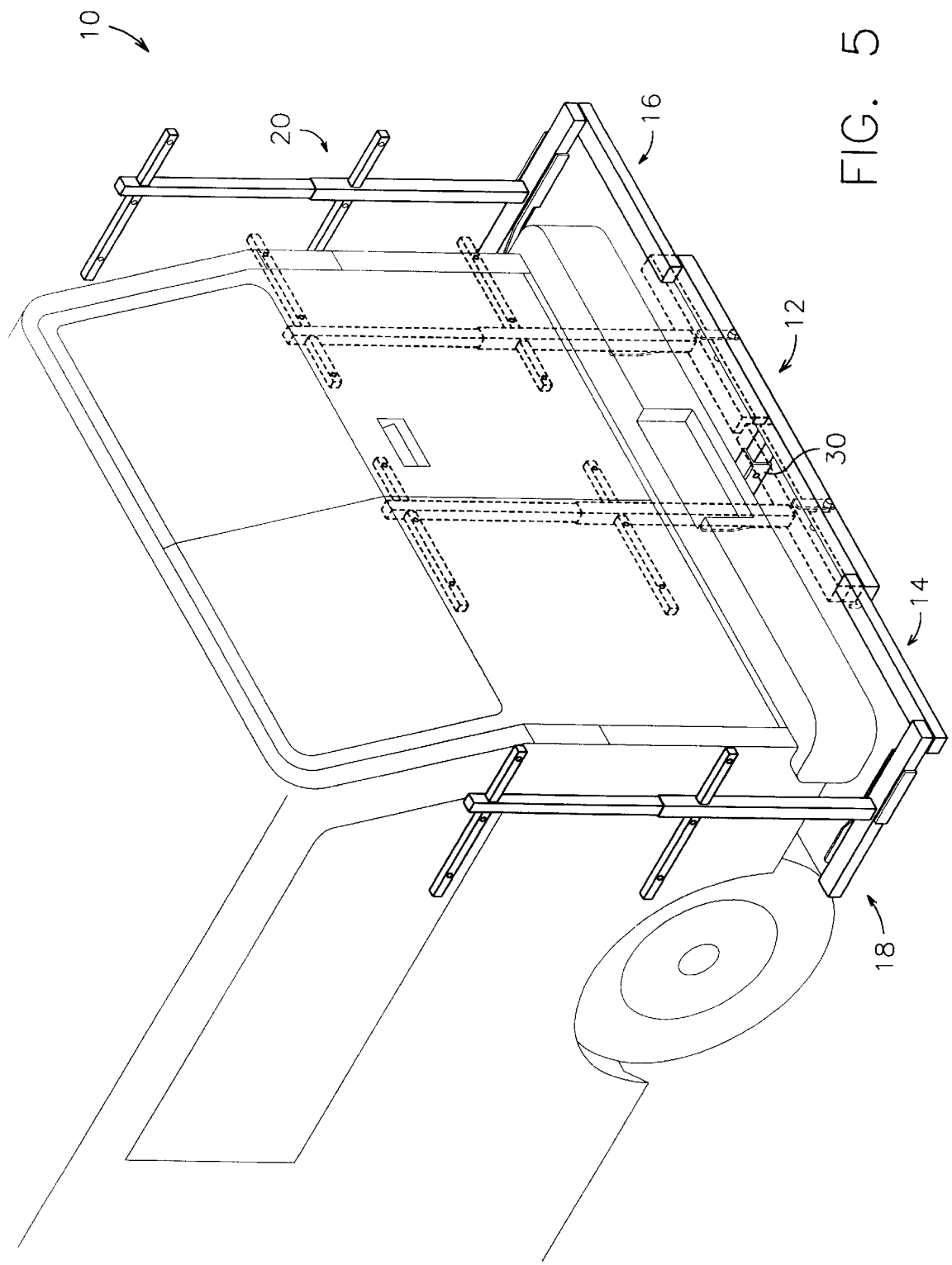
FIG. 5 is a perspective view of the equipment rack of FIG. 1 installed on a vehicle.

Referring to FIGS. 1, 6 and 7, tongue 22 is attached at right angles to lower cross member 24. For added support, tongue 22 may be constructed as an inner tongue 22a inside an outer tongue 22b. An optional tongue brace plate 26 spans the joint between tongue 22 and lower cross member 24. Hitch pin housings 28 extend horizontally through tongue 22. Equipment rack 10 is mounted on the vehicle by inserting tongue 22 into a conventional receiver type trailer hitch 30, as shown in FIG. 5. Pin 32 passes through one of the pin housings 28 to secure equipment rack 10 to trailer hitch 30. Two (or more) pin housings 28 are provided so that equipment rack 10 may be mounted closer to or farther away from the back of the vehicle, as may be necessary or desirable. In one embodiment, pin housings 28 are internally threaded and pin 32 consists of a pair of threaded bolts that screw into each end of pin housings 28. Other pin systems could be used. For example, a through pin held with a retainer clip, such as that used on many conventional receiver hitch/ball mounts, could be used. The threaded bolt type pin system described above allows for the use of a locking bolt (a bolt with a unique head pattern that is removed only with a mating socket) as a theft deterrent. An "L" shaped stop bar 34 is attached to and extends past each end of lower cross member 24. Lower pins 36 are attached to and extend up from lower cross member 24. Lower pins 36 are positioned near each end of lower cross member 24. Latch locking pin housings 38 extend horizontally through lower cross member 24 approximately midway between tongue 22 and each end of lower cross member 24. Latch locking pins 40 are mounted in pin housings 38 so that they extend frontward and rearward slightly away from lower cross member 24.

The left middle cross arm assembly 14 is detailed in FIGS. 8 and 9. The right middle cross arm assembly 16 is a mirror image of left middle cross arm assembly 14. Referring to FIGS. 1, 8 and 9, "L" shaped middle arm stops 42 are attached to and project down from the bottom of middle cross arms 44. Preferably, middle arm stops 42 are positioned at the approximate center of middle cross arms 44 directly below uprights 52. Large bearing housings 46 are mounted along upper surface 44a at the inside end 44b of middle cross arms 44. Small bearing housings 48 are mounted along upper surface 44a at the outside end 44c of middle cross arms 44. Lower bearing housings 50 are mounted along the lower surface 44d at each end of middle cross arms 44.

Figure 10:
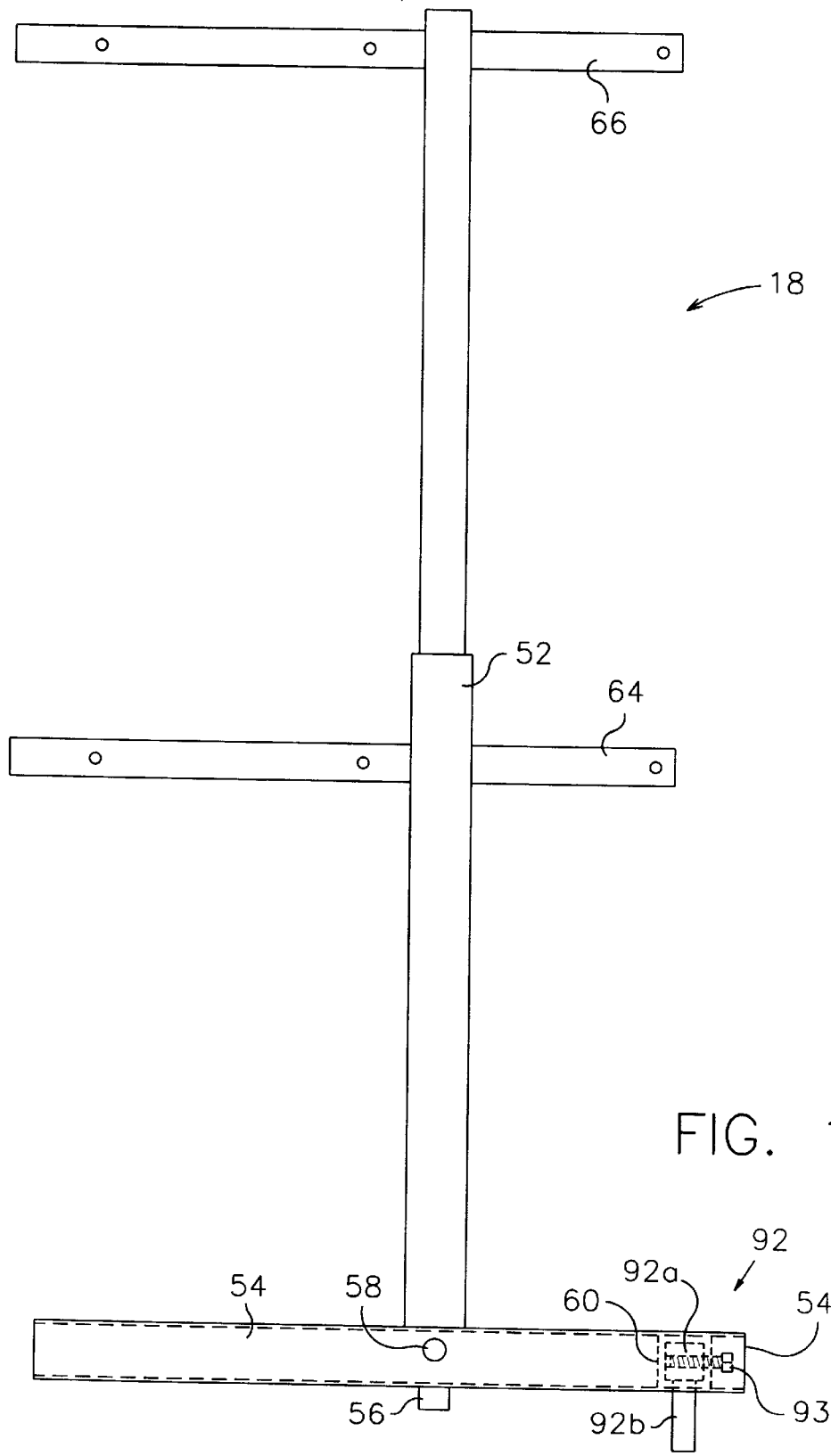
FIG. 10 is an elevation view of the left upper member assembly.
Figure 12:
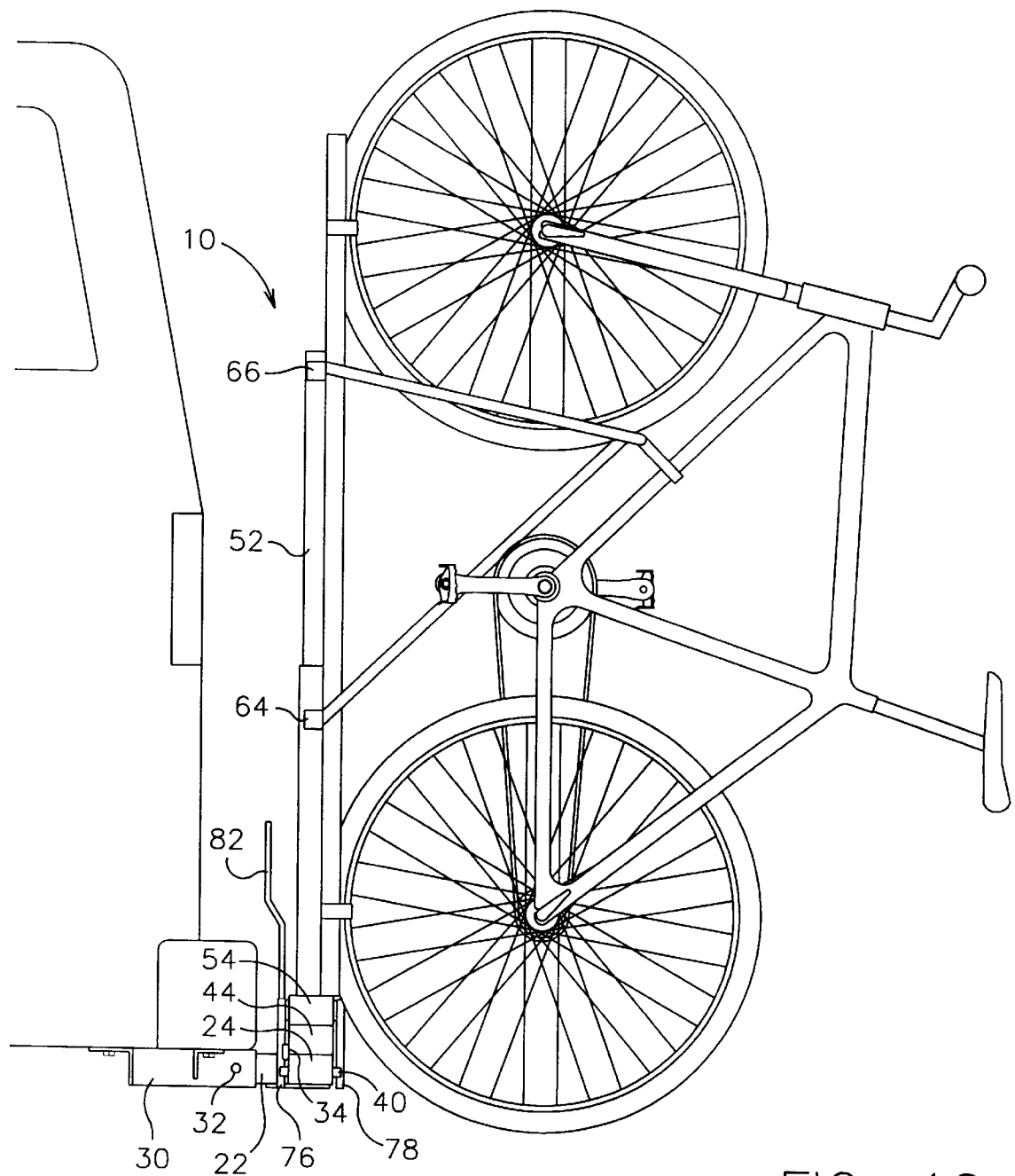
FIG. 12 is a side view of the equipment rack installed on the vehicle and loaded with a bicycle.

The left upper member assembly 18 is detailed in FIG. 10. The right upper member assembly 20 is a mirror image of left upper member assembly 18. Referring to FIGS. 1 and 10, uprights 52 are mounted to and extend up from upper cross arms 54. Uprights 52 are mounted slightly off center to the inside of upper cross arms 54. "L" shaped upper arm stops 56 are attached to the bottom and extend down from upper cross arms 54. Upper arm stops 56 are positioned directly below uprights 52. Latch shaft housings 58 extend horizontally through upper cross arms 54 directly below uprights 52. Upper pin receivers 60 are mounted in upper cross arms 54 near the inside end 54a of upper cross arms 54. Upper pin receivers 60 are vertically oriented sections of square tubing sized and shaped to receive the block shaped upper portion 92a of upper pins 92. Bolts 93 secure pins 92 in upper cross arms 54. Bolts 93 pass through the hole in pin receivers 60 and into the threaded hole in upper portion 92a of pins 92. As with the trailer hitch pin 32, for added security bolts 93 can be constructed as locking bolts with a unique head pattern that is removed only with a mating socket.

First accessory cross arms 64 are attached to and extend horizontally from the lower portion of uprights 52. Second accessory cross arms 66 are attached to and extend horizontally from the upper portion of uprights 52.

Left and right latches 70 and 72 secure equipment rack 10 in the closed position. The parts of left latch 70 are detailed in FIGS. 11a, 11b, 11c and 11d. The parts of right latch 72 are mirror images of the parts of left latch 70. Referring to FIGS. 1 and 11a–11d, latch shafts 74 extend through latch shaft housings 58 in upper cross arms 54. Latch shafts 74 are attached at their ends to rear latch bodies 76 and front latch bodies 78. Optional latch washers 80 are sandwiched between rear and front latch bodies 76 and 78 and upper cross arms 54. Latch handles 82 are attached to and project up from rear latch bodies 76. Slots 84 are formed in latch bodies 76 and 78. Slots 84 are sized and shaped to receive latch locking pins 40 that extend out from lower cross member 24. Slots 84 may be curved slightly to help latch bodies 76 and 78 fit tightly on latch locking pins 40 when equipment rack 10 is in the closed position.

Middle cross arms 44 are operatively coupled to lower cross member 24 through lower pins 36 and a first series of bearings and washers. Referring to FIG. 1, middle cross arms 44 are mounted on and pivot about lower pins 36. Lower bearings 86 on lower pins 36 are mounted in the outside lower bearing housings 50 in middle cross arms 44. Lower pin washers 88 on pins 36 are sandwiched between adjoining surfaces of middle cross arms 44 and lower cross member 24. Upper bearings 90 on lower pins 36 are mounted in small bearing housings 48 in middle cross arms 44.

Upper cross arms 54 are operatively coupled to middle cross arms 44 through upper pins 92 and a second series of bearings and washers. Upper pins 92 have a block shaped upper portion 92a and a pin shaped lower portion 92b. The block shaped upper portion 92a of upper pins 92 is mounted in pin receivers 60 on the inside ends of upper cross arms 54. Lower bearings 94 on pin portion 92b is mounted in lower bearing housings 50 on the inside ends of middle cross arms 44. Upper bearings 96 on pin portion 92b are mounted in large bearing housings 46 on the inside ends of middle cross arms 44. Upper pin washers 98 on pin portions 92b are sandwiched between adjoining surfaces of upper and middle cross arms 44 and 54.

Large sprocket wheels 100 are mounted on pin portion 92b of upper pins 92 at the inside ends of middle cross arms 44 between lower bearings 94 and upper bearings 96. Small sprocket wheels 102 are mounted on lower pins 36 at the outside ends of middle cross arms 44 between lower bearings 86 and upper bearings 90. Chains 104 extend around large sprocket wheels 100 and small sprocket wheels 102.

Figure 2:
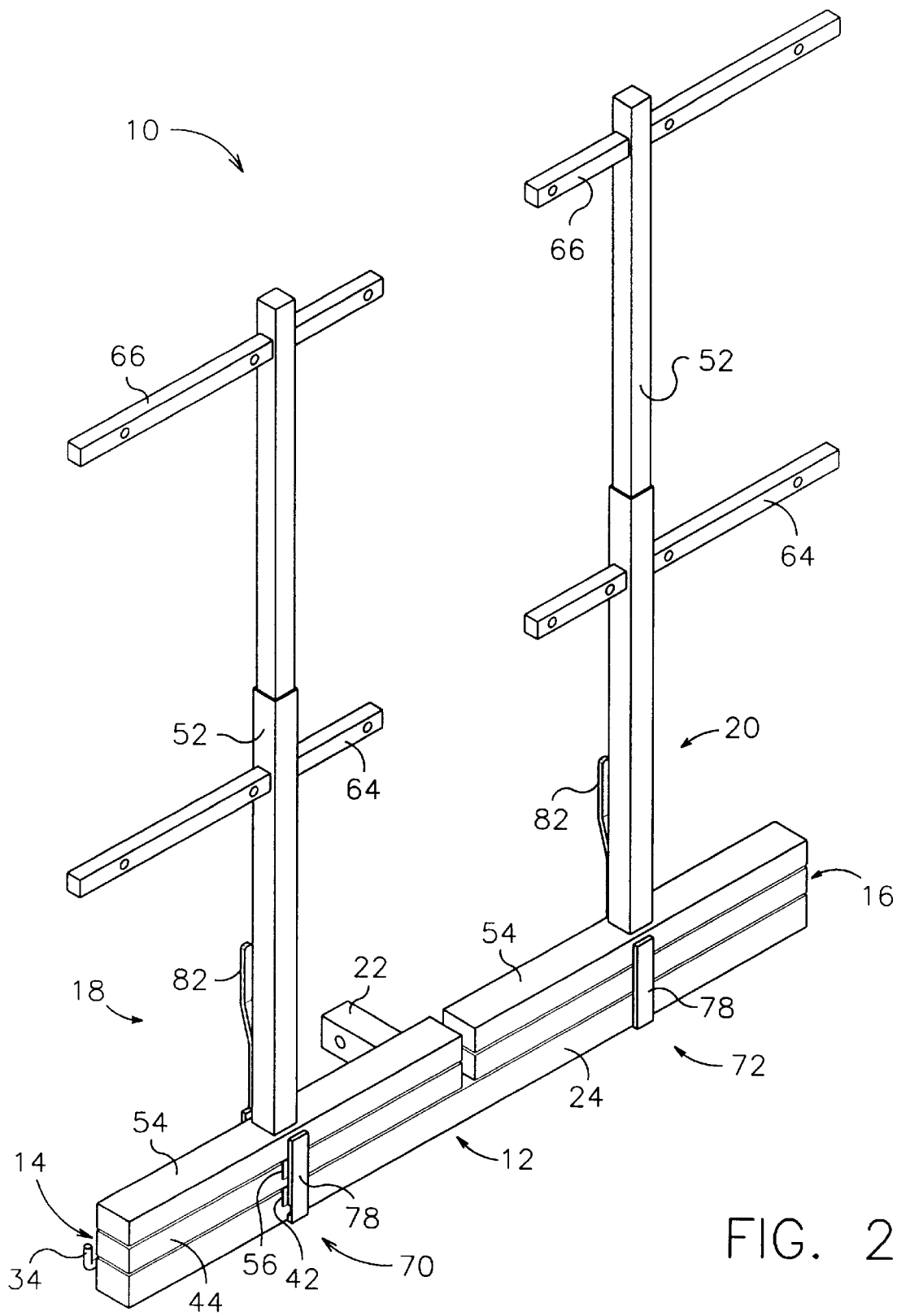
FIG. 2 is a perspective view of the vehicle equipment rack of FIG. 1 in the closed position.
Figure 3:
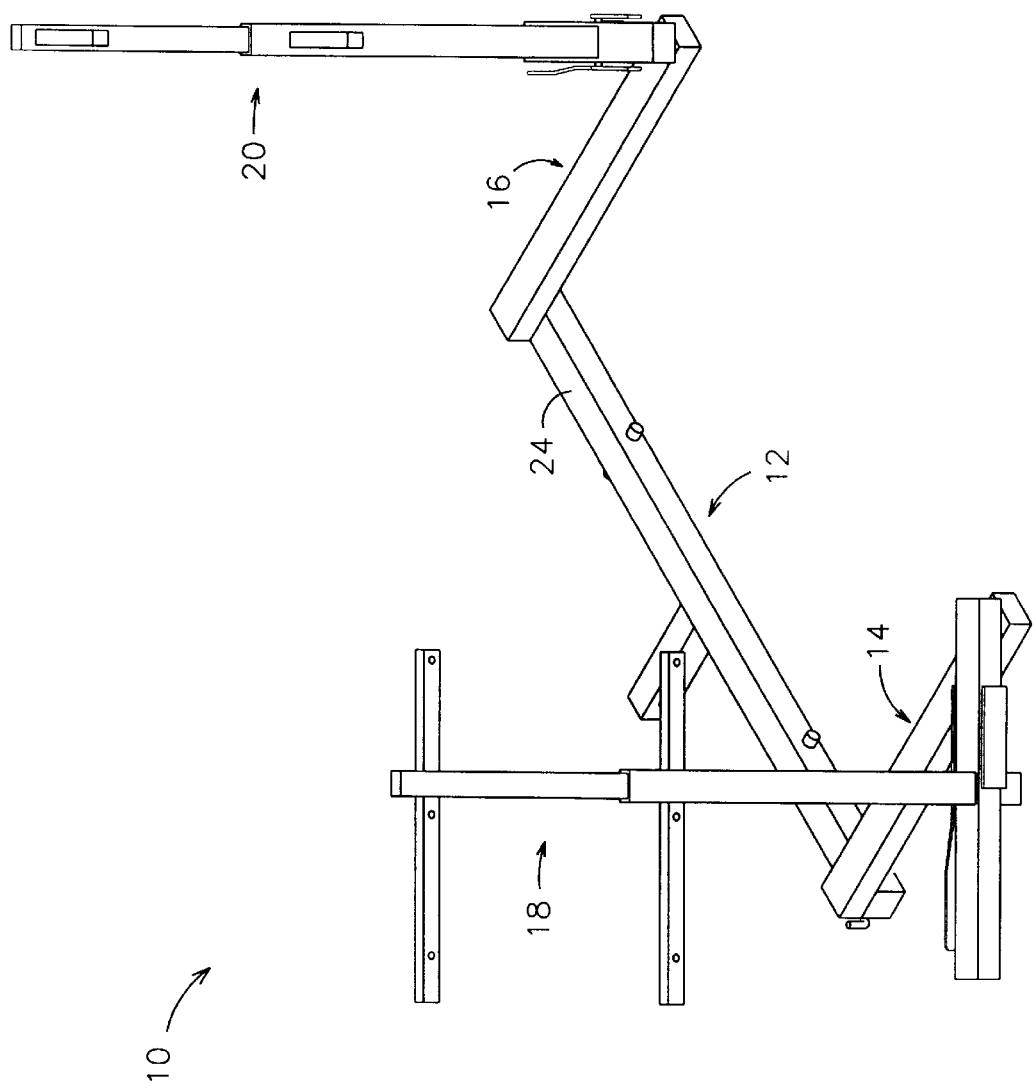
FIG. 3 is a perspective view of the equipment rack of FIG. 1 in a partially open position.
Figure 4:
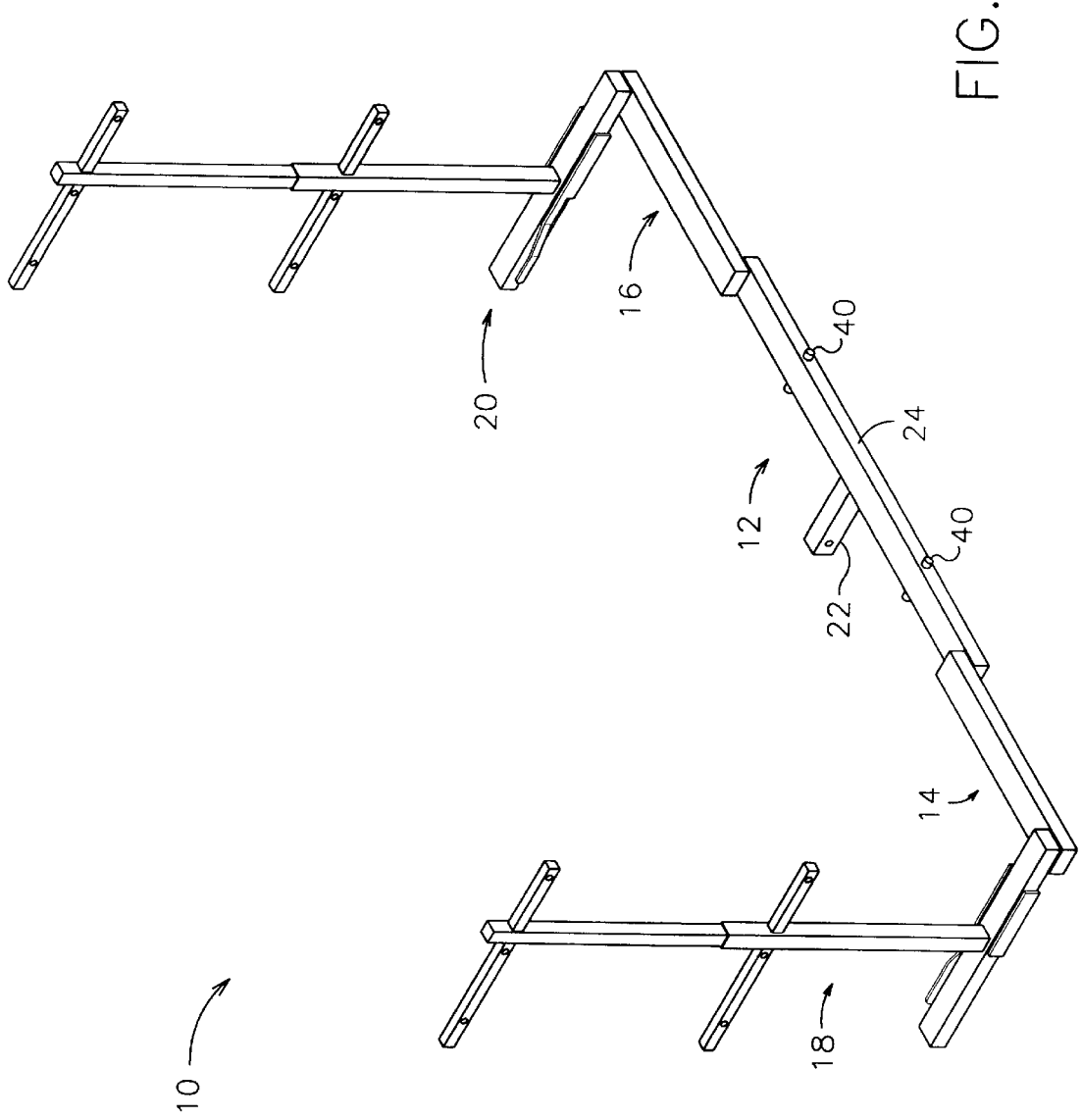
FIG. 4 is a perspective view of the equipment rack of FIG. 1 in the fully open position.

Referring to FIGS. 2–5, equipment rack 10 moves between the fully closed and latched position of FIG. 2 and the fully open position of FIG. 4. In FIG. 5, the closed position is illustrated by dotted lines and the open position is indicated by solid lines. As can be seen in FIG. 5, there is unobstructed access to the rear of the vehicle when equipment rack 10 is in the fully open position. Each side of equipment rack 10 is latched or unlatched by rotating handles 82 of latches 70 and 72. For example, the left side of equipment rack 10 is opened by rotating handle 82 of left latch 70 counterclockwise from the vertical latched position of FIG. 2 to the horizontal unlatched position of FIGS. 3 and 4. As handle 82 rotates down, the rear and front latch bodies 76 and 78 rotate up on latch shafts 74 to release latch locking pin 40 from slots 84 in latch bodies 76 and 78. (Latch shafts 74 and slots 84 are shown in FIGS. 1 and 11.)

Once equipment rack 10 is unlatched, it is opened by pulling away from the rear of the vehicle. It is easiest to grab and pull on any part of the upper member assemblies 18 and 20. The bearing system described above makes it easy to open the rack even when it is fully loaded. The rack unfolds as middle cross arms 44 pivot (clockwise on the left side, counterclockwise on the right side) relative to lower cross member 24. At the same time, upper cross arms 54 pivot (counterclockwise on the left side, clockwise on the right side) relative to middle cross arms 44. Pulling on upper member assemblies 14 and 16 rotates pins 92 to drive/rotate large sprocket wheels 100. The rotating large sprocket wheels 100 wrap and unwrap chains 104 around the small fixed sprocket wheels 102. The relative degree of rotation between middle cross arms 44 and upper cross arms 54 is determined by the relative pitch diameter of large sprocket wheels 100 and small sprocket wheels 102. The angle of rotation of middle cross arms 44 relative to lower cross members 24 is a predetermined multiple, preferably in the range of 1 to 3, of the angle of rotation of upper cross arms 54 relative to middle cross arms 44. In the embodiment of the invention shown in FIGS. 2–4, the pitch diameter of large sprocket wheels 100 is approximately twice the pitch diameter of small sprocket wheels 102 so that middle cross arms 44 rotate about 2° for every 1° of rotation of upper cross arms 54. Manufacturing and assembly tolerances, which may be as great as ±10% will effect the actual degree of rotation of the cross arms. Therefore, for the embodiment of FIGS. 2–4 it is expected that middle cross arms 44 will actually move in the range of 1.5° to 2.5° for every 1° of rotation of upper cross arms 54. Between the closed and partially open positions of FIGS. 2 and 3, middle cross arms 44 rotate about 90° relative to lower cross member 24 and upper cross arms 54 rotate about 45° relative to middle cross arms 44. Between the closed and fully open positions of FIGS. 2 and 4, middle cross arms 44 rotate about 180° relative to lower cross member 24 and upper cross arms 54 rotate about 90° relative to middle cross arms 44.

Stop bars 34 block the rotation of middle cross arms 44 beyond the fully open position shown in FIG. 4. The interconnection of middle cross arms 44 and upper cross arms 54 through sprocket wheels 100 and 102 and chain 104, in turn, blocks the rotation of upper cross arms 54 beyond the fully open position. Middle arm stops 42 block the rotation of middle cross arms 44 beyond the closed position. Upper arm stops 56 block the rotation of upper cross arms 54 beyond the closed position.

It is expected that tongue 22, lower cross member 24, middle cross arms 44, upper cross arms 54, uprights 52, and accessory cross arms 64 and 66 will usually be made of rectangular or square steel tubing. However, any structurally stable material and cross sectional size and shape may be used. Some type of tubular or recessed material is preferred to allow for the internal placement/containment of the various interconnecting parts. Bearings, bushings and the like should be used to facilitate the relative motion of the lower, middle and upper assembly parts. It has been observed that radial ball bearings or needle bearings allow the user to easily open and close the equipment rack even when it is fully loaded with six bicycles. In a typical assembly process, the bearings are pressed into the housing and the pins are pressed into the bearings and the sprocket wheels. An E-clip or other suitable retainer is installed on the pins to keep the bearing/pin assemblies from coming apart. Self lubricating brass or zinc plated steel washers are preferred for lower pin washers 88 and middle pin washers 98.

Although a chain and sprocket drive train is shown, any suitable drive train could be used. For example, the sprocket wheels could be replaced by gears, a belt could be used instead of chain 104, or a cable winding and unwinding around shafts with a diameter ratio matching the sprocket pitch diameter could be substituted for the sprocket and chain assembly. What is important is that the driving rotation of the upper cross arms 54 be transferred to the middle cross arms 44 at a predetermined controlled rate.

The various parts may be assembled by welding, by mechanical fasteners or any other suitable fastener. "Inside" and "outside" refer to the relative position of parts when equipment rack 10 is closed.

While the present invention has been shown and described with reference to the foregoing preferred embodiment, it will be apparent to those skilled in the art that other embodiments of the invention may be developed. For example, each set of articulating arms could be positioned side by side rather than one over the other as shown and described above. Or, the middle cross arms could be positioned next to the lower cross member rather than over the lower cross member. More than two arms could be used in each set of articulating cross arms. Therefore, the preferred embodiment is intended to illustrate but not limit the invention as defined in the following claims.

What is claimed is:

1. A vehicle equipment rack, comprising:
    a lower cross member oriented horizontally when the equipment rack is installed on the vehicle, the lower cross member having a first end, a second end and a middle portion between the first and second ends;
    a first hitch member operatively connected to the lower cross member, the first hitch member configured to couple to a second hitch member on a vehicle;
    a pair of middle cross arms horizontally disposed opposite one another over the lower cross member, each middle cross arm having a first end and a second end, the first end of each middle cross arm rotatably connected to respective ones of the ends of the lower cross member;
    a pair of upper cross arms horizontally disposed opposite one another over the middle cross arms, each upper cross arm having a first end, a second end and a middle portion between the first and second ends, the first end of each upper cross arm rotatably connected to respective ones of the second ends of the middle cross arms; and
    an equipment mount operatively connected to one of the upper cross arms.

2. A vehicle equipment rack according to claim 1, wherein the first hitch member comprises a tongue attached to and extending horizontally from the middle portion of the lower cross member.

3. A vehicle equipment rack according to claim 1, wherein the equipment mount is operatively connected to the one of the upper cross arms by an upright.

4. A vehicle equipment rack according to claim 3, wherein the equipment mount comprises an accessory arm attached to and extending horizontally from the upright.

5. A vehicle equipment rack, comprising:
    a lower cross member oriented horizontally when the equipment rack is installed on the vehicle, the lower cross member having a first end, a second end and a middle portion between the first and second ends;
    a pair of middle cross arms horizontally disposed opposite one another over the lower cross member, each middle cross arm having a first end and a second end, the first end of each middle cross arm rotatable connected to respective ones of the ends of the lower cross member;
    a pair of upper cross arms horizontally disposed opposite one another over the middle cross arms, each upper cross arm having a first end, a second end and a middle portion between the first and second ends, the first end of each upper cross arm rotatable connected to respective ones of the second ends of the lower cross arms:

an equipment mount operatively connected to one of the upper cross arms: and a drive train operatively connected between each of the middle cross arms and respective ones of the upper cross arms, each drive train configured to rotate one of the middle or upper cross arms upon rotation of the upper or middle cross arm connected thereto.

6. A vehicle equipment rack, comprising:

a lower cross member oriented horizontally when the equipment rack is installed on the vehicle, the lower cross member having a first end, a second end and a middle portion between the first and second ends;

a pair of middle cross arms horizontally disposed opposite one another over the lower cross member, each middle cross arm having a first end and a second end, the first end of each middle cross arm rotatably connected to respective ones of the ends of the lower cross member;

a pair of upper cross arms horizontally disposed opposite one another over the middle cross arms, each upper cross arm having a first end, a second end and a middle portion between the first and second ends, the first end of each upper cross arm rotatably connected to respective ones of the second ends of the lower cross arms;

an equipment mount operatively connected to one of the upper cross arms; and at least one latch movably mounted to one of the cross arms, the latch operative between a first position in which the latch blocks the upper and middle cross arms and a second position in which the latch does not block the upper and middle cross arms.

7. A vehicle equipment rack according to claim 6, wherein the at least one latch comprises a latch mounted to each of the upper cross arms.

8. A vehicle equipment rack according to claim 7, further comprising:

latch locking pins projecting from the lower cross member; and a slot in each of the latches, each slot configured to receive one of the locking pins when the latch is in the first position.

9. A vehicle equipment rack according to claim 6, further comprising:

latch locking pins projecting from the lower cross member; and the at least one latch comprising first and second latches the at least one latch comprising first and second latches respectively mounted to two of the cross arms; and a slot in each of the latches, each slot configured to receive one of the locking pins when the latch is in the first position.

* * * * *